United States Patent
Schroter et al.

(10) Patent No.: US 7,470,890 B2
(45) Date of Patent: Dec. 30, 2008

(54) FIELD-MODULATING ANGULAR POSITION MEASURING DEVICE HAVING A SCANNING DISTANCE DETERMINABLE IN ACCORDANCE WITH TEMPERATURE AND SIGNAL AMPLITUDES

(75) Inventors: Andreas Schroter, Traunstein (DE); Steffen Bielski, Garching/Alz (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 101 days.

(21) Appl. No.: 11/497,207

(22) Filed: Jul. 31, 2006

(65) Prior Publication Data

US 2007/0029470 A1 Feb. 8, 2007

(30) Foreign Application Priority Data

Aug. 2, 2005 (DE) .................. 10 2005 036 161

(51) Int. Cl.
*G01D 5/34* (2006.01)
(52) U.S. Cl. ................... 250/231.13; 250/238
(58) Field of Classification Search ................
250/231.13–231.18, 238, 237 R, 237 G,
250/214 PR; 356/616–617; 341/15; 73/1.75;
324/207.13–207.16, 207.2–207.25; 33/1 PT,
33/1 N, 1 L, 706–708
See application file for complete search history.

(56) References Cited

U.S. PATENT DOCUMENTS

| | | | | |
|---|---|---|---|---|
| 5,021,650 A | * | 6/1991 | Rieder et al. ........... 250/231.16 |
| 5,055,781 A | * | 10/1991 | Sakakibara et al. .... 324/207.21 |
| 5,065,525 A | | 11/1991 | Szenger |
| 5,097,122 A | * | 3/1992 | Colman et al. ......... 250/231.14 |
| 5,150,103 A | * | 9/1992 | Janssen-Weets .......... 340/686.3 |
| 5,283,434 A | * | 2/1994 | Ishizuka et al. ......... 250/237 G |
| 5,493,399 A | * | 2/1996 | Meyer et al. ................. 356/619 |
| 5,627,466 A | * | 5/1997 | Spies et al. ............. 324/207.21 |
| 6,326,781 B1 | | 12/2001 | Kunde et al. |
| 6,639,207 B2 | * | 10/2003 | Yamamoto et al. ...... 250/231.14 |
| 6,756,582 B2 | * | 6/2004 | Stridsberg .............. 250/231.13 |
| 6,806,461 B2 | | 10/2004 | Strasser |
| 7,187,305 B2 | * | 3/2007 | Ellis et al. ...................... 341/14 |
| 2001/0030283 A1 | | 10/2001 | Strasser |
| 2005/0098715 A1 | * | 5/2005 | Kataoka ................ 250/231.13 |
| 2005/0263687 A1 | * | 12/2005 | Kauhanen et al. ....... 250/231.13 |
| 2005/0263688 A1 | * | 12/2005 | Kauhanen .............. 250/231.13 |
| 2006/0043963 A1 | | 3/2006 | Kaneyasu et al. |
| 2006/0061489 A1 | * | 3/2006 | Ellis et al. ...................... 341/13 |

FOREIGN PATENT DOCUMENTS

EP 1 126 248 8/2001

\* cited by examiner

*Primary Examiner*—Que T Le
(74) *Attorney, Agent, or Firm*—Kenyon & Kenyon LLP

(57) ABSTRACT

A field-modulating angular position measuring device includes a scanning device, a measuring graduation, and evaluation electronics, the scanning device and the measuring graduation being arranged at a scanning distance rotatably relative to each other, and angle-dependent output signals being producible by the scanning device, which may be processed further in the evaluation electronics. The angular position measuring device furthermore has a unit for determining the signal amplitudes of the output signals. The angular position measuring device furthermore includes a temperature sensor, which is able to determine a temperature in the angular position measuring device. The angular position measuring device is configured such that the scanning distance may be determined on the basis of the temperature and the signal amplitudes. Furthermore, a method for operating such an angular position measuring device makes it possible, e.g., to determine a change in length of a shaft.

25 Claims, 3 Drawing Sheets

FIELD-MODULATING ANGULAR POSITION MEASURING DEVICE HAVING A SCANNING DISTANCE DETERMINABLE IN ACCORDANCE WITH TEMPERATURE AND SIGNAL AMPLITUDES

CROSS-REFERENCE TO RELATED APPLICATIONS

The present application claims priority to Application No. 10 2005 036 161.7, filed in the Federal Republic of Germany on Aug. 2, 2005, which is expressly incorporated herein in its entirety by reference thereto.

FIELD OF THE INVENTION

The present invention relates to a field-modulating angular position measuring device and to a method for operating the field-modulating angular position measuring device.

BACKGROUND INFORMATION

Field-modulating angular position measuring devices may be based on an inductive, magnetic or capacitive measuring principle and are used, for example, in rotary encoders for determining the angular position of two machine parts that are rotatable with respect to each other.

As a scanning device in field-modulating inductive angular position measuring devices, excitation coils and receiver coils are often mounted in the form of circuit traces on a shared circuit board, which is permanently connected, for example, to a stator of a rotary encoder. Arranged across from this circuit board is another board, on which as a measuring graduation electrically conductive areas are mounted at periodic intervals, and which is connected to the rotor of the rotary encoder in a rotatably fixed manner. If an electric excitation field is applied on the excitation coils, output signals as a function of the angular position are generated in the receiving coils during the relative rotation between rotor and stator. These output signals are then processed further in evaluation electronics. The components of such evaluation electronics are often accommodated on an additional circuit board. The circuit board having the excitation and receiver coils and the circuit board having the evaluation electronics are often connected to each other via flex conductors and plug-in connections.

European Published Patent Application No. 1 126 248 describes a method for determining the scanning distance, which is suited to calibrate exactly the scanning distance for the calibrating operation prior to the actual measuring operation. The method and the angular position measuring device are believed to have the disadvantage that in the actual measuring operation of the angular position measuring device the scanning distance can be determined only in a comparatively imprecise manner.

SUMMARY

Example embodiments of the present invention may provide a field-modulating, e.g., an inductive, angular position measuring device and a method for operating the same such that an extremely precise determination of the scanning distance may be possible even during the actual measuring operation.

In an example embodiment of the present invention, a field-modulating angular position measuring device, includes, among other things, a scanning device, a measuring graduation and evaluation electronics. The scanning device and the measuring graduation are arranged at a scanning distance rotatably relative to each other. The scanning device is able to produce angle-dependent output signals which may be processed further in the evaluation electronics. The angular position measuring device moreover includes a unit for determining the magnitude or height of the signal amplitudes of the output signals as well as a temperature sensor. The temperature sensor makes it possible to determine the temperature in the angular position measuring device. The angular position measuring device is configured such that the scanning distance may be determined on the basis of the temperature and the signal amplitudes.

Such a development of the angular position measuring device makes it possible to determine the scanning distance in an extremely precise manner even when the angular position measuring device is already in operation for a longer period. Thus, a temperature-based correction is able to achieve an more exact determination of the scanning distance.

Field-modulating angular position measuring devices should be understood as angular position measuring devices in which a measuring principle is used that is based on the angle of rotation-based modulation of electromagnetic fields, the measurement in particular being based on an inductive, magnetic or capacitive principle or a combination of the mentioned measuring principles.

The unit for determining the signal amplitudes may be associated with a regulator unit which is configured such that the signal amplitudes of the output signals due to an influencing of an actuating variable do not exceed a specified deviation from a setpoint amplitude value.

The angular position measuring device itself may be equipped with an electronics which is able to determine the scanning distance. For example, the evaluation electronics may be configured such that it may be used to determine the scanning distance. The scanning distance may then be transmitted, for example, via a digital interface to external (in relation to the angular position measuring device) subsequent electronics for further electronic processing. Alternatively, an angular position measuring device may be provided in which the determined scanning distance is electronically processed further internally within the angular position measuring device. The determined or computed scanning distance is thus used for further electronic processing within or outside the angular position measuring device.

The field-modulating angular position measuring device may include a circuit for determining the relative rotational speed between the scanning device and the measuring graduation. This rotational speed is additionally taken into account for determining the scanning distance.

The evaluation electronics may generate a digital value for the scanning distance, that is, a binary number, which may then be processed further in a microprocessor. If this microprocessor is arranged outside of the angular position measuring device, then the angular position measuring device may include an interface, via which the value may be transmitted to subsequent electronics.

The evaluation electronics may include an ASIC chip, the temperature sensor, e.g., being integrated into this chip, e.g., in the form of a temperature-sensitive resistive circuit.

The field-modulating angular position measuring device may have a protruding shaft end, or have a hollow shaft, into which a shaft may be inserted, the angular position or rotational speed of which is to be measured. Thus, in this arrangement, the angular position measuring device is configured such that the shaft may be received by the angular position measuring device in an enclosing manner.

In a method for operating a field-modulating angular position measuring device, when the angular position measuring device is in operation, the measuring graduation is scanned by the scanning device such that angle-dependent output signals are produced in this scanning operation. First, the actual signal amplitudes of the output signals are determined in the sense of an actual value. Furthermore, the temperature in the angular position measuring device is measured. The scanning distance is then determined on the basis of the signal amplitudes and the measured temperature.

The determination may be performed such that the scanning distance is available in a form that allows for further electronic processing within or outside of the angular position measuring device. That is, the processing or evaluation of the scanning distance is performed either in the evaluation electronics in the angular position measuring device or the scanning distance is processed further outside of the angular position measuring device, for example, in subsequent electronics.

The deviation between the previously determined signal amplitudes of the output signals and a setpoint amplitude value may be determined. An actuating variable is then ascertained as a function of the magnitude of the deviation with the aim of keeping the deviation within specified limits. The scanning distance is then determined on the basis of the actuating variable. Accordingly, the actuating variable in turn is based on the previously determined signal amplitudes. According to this arrangement, the scanning distance is therefore also determined on the basis of the signal amplitudes and the measured temperature.

In the operation of the angular position measuring device, the relative rotational speed between the scanning device and the measuring graduation may be measured and taken into account in a correcting manner when determining the scanning distance. That is, the determination of the scanning distance and/or of the change in length of the shaft is also based on the existing rotational speed.

A change in the length of the shaft may be determined for a point on the shaft outside of the angular position measuring device on the basis of the scanning distance. This makes it possible to perform an axial position correction, e.g., for a tool attached to the shaft by taking this change in the shaft length into account. Consequently, this measure allows both for the rotational position of the shaft as well as for its change in length to be determined by just one measuring device. The term shaft in the following also includes a tool that is attached to the shaft in an axially fixed manner. In other words, the term shaft also includes assemblies of multiple parts.

According to an example embodiment of the present invention, a field-modulating angular position measuring device includes: a scanning device adapted to produce angle-dependent output signals; a measuring graduation, the scanning device and the measuring graduation arranged rotatably with respect to each other at a scanning distance; evaluation electronics adapted to process the output signals; a unit adapted to determine signal amplitudes of the output signals; and a temperature sensor adapted to determine a temperature in the angular position measuring device, the scanning distance determinable in accordance with the temperature and the signal amplitudes.

The unit may be associated with a regulator unit adapted to regulate the signal amplitudes of the output signals in accordance with an actuating variable to not exceed a specified deviation from a setpoint amplitude value.

The field-modulating angular position measuring device may include a circuit adapted to determine a relative rotational speed between the scanning device and measuring graduation to determine the scanning distance.

The evaluation electronics may be adapted to determine the scanning distance.

The evaluation electronics may be adapted to determine a digital value for the scanning distance.

The field-modulating angular position measuring device may include an interface adapted to transmit a value for the scanning distance to subsequent electronics.

The evaluation electronics may include an ASIC chip.

The temperature sensor may be integrated into the evaluation electronics.

The angular position measuring device may be configured such that a shaft, an angle of rotation of which is to be measured, is receivable by the angular position measuring device in an enclosing manner.

The angular position measuring device may be arranged as an inductive angular position measuring device.

According to an example embodiment of the present invention, a method for operating a field-modulating angular position measuring device that includes a scanning device and a measuring graduation rotatable relative to each other, angle-dependent output signals produced in the scanning device, includes: (a) determining signal amplitudes of the output signals; (b) measuring a temperature in the angular position measuring device; and (c) determining a scanning distance in accordance with the signal amplitudes and the temperature.

The method may include: determining a deviation between the signal amplitudes of the output signals determined in the determining step (a) and a setpoint amplitude value; and ascertaining an actuating variable as a function of a magnitude of the deviation to maintain the deviation within specified limits, the scanning distance determined in the determining step (c) in accordance with the actuating variable.

The field-modulating angular position measuring device may be arranged on a shaft, and the method may include determining a change in length of the shaft for a point on the shaft outside of the angular position measuring device in accordance with the scanning distance.

The method may include detecting a relative rotational speed between the scanning device and the measuring graduation, and the scanning distance may be determined in the determining step (c) in accordance with the rotational speed.

The method may include simultaneously processing the output signals and measuring the temperature in the measuring step (b) in evaluation electronics.

The angular position measuring device may be arranged as an inductive angular position measuring device.

According to an example embodiment of the present invention, a field-modulating angular position measuring device includes: scanning means for producing angle-dependent output signals; measuring graduation means, the scanning means and the measuring graduation means rotatably with respect to each other at a scanning distance; evaluation means for processing the output signals; means for determining signal amplitudes of the output signals; and temperature sensing means for determining a temperature in the angular position measuring device, the scanning distance determinable in accordance with the temperature and the signal amplitudes.

Further details and aspects of field-modulating angular position measuring devices according to example embodiments of the present invention and of the method for operating angular position measuring devices are described in more detail below with reference to the appended Figures.

DETAILED DESCRIPTION

Figure 1:
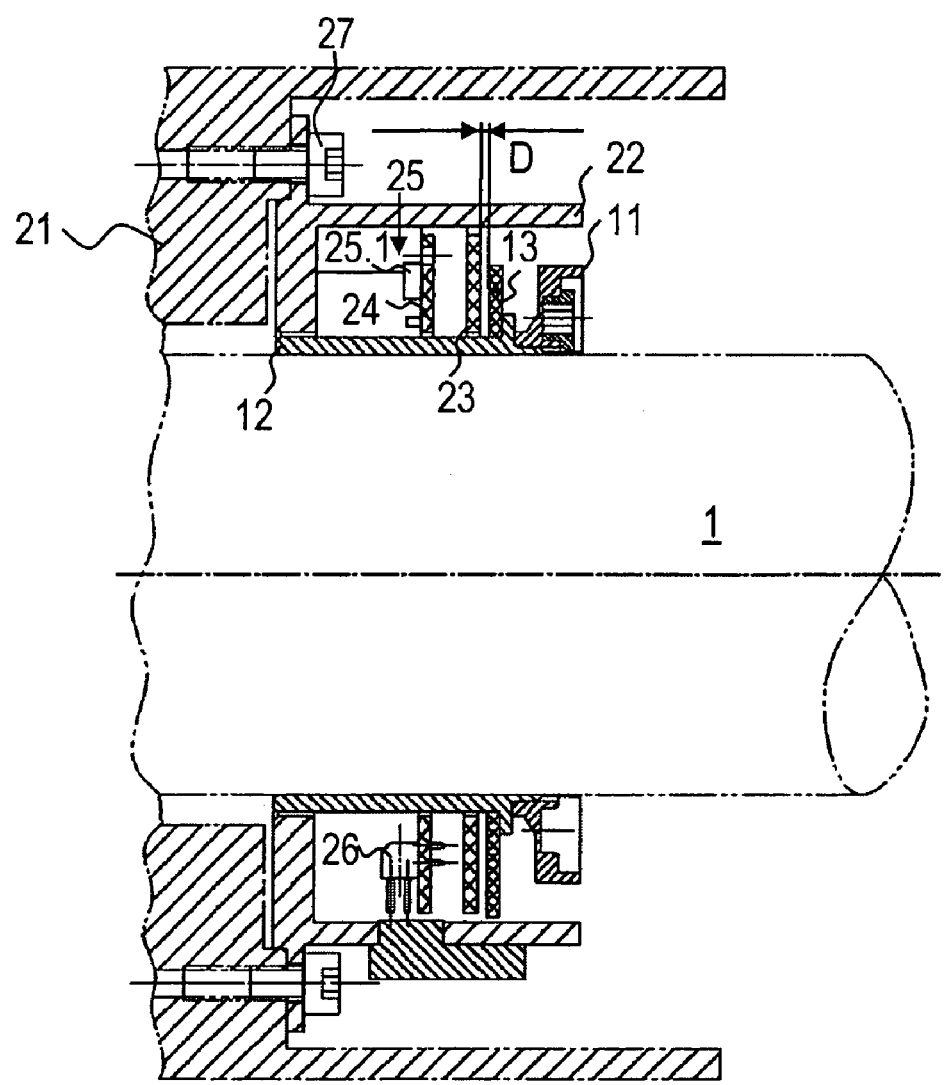
FIG. 1 is a cross-sectional view of an angular position measuring device.

FIG. 1 illustrates an angular position measuring device according to an example embodiment of the present invention, which is arranged as an inductive angular position measuring device. Accordingly, a sleeve 12 is arranged on a shaft 1, which is rotatably fixed to shaft 1 by a clamping ring 11. Both sleeve 12 as well as shaft 1 are made of steel such that sleeve 12 and shaft 1 have the same coefficient of thermal expansion. A measuring graduation 13 is fastened to sleeve 12. This is made of a ring-shaped circuit board, on which in periodic succession and in equal division steps conductive and nonconductive regions, that is regions having different electrical conductivity, are provided.

A scanning device 23 is arranged opposite of measuring graduation 13 at a scanning distance D (enlarged representation in FIG. 1). Scanning device 23 is also arranged as a ring-shaped circuit board, which includes excitation and sensor coils. Furthermore, scanning device 23 is fastened to a housing 22, which in turn is fixed to a flange 21 by bolts 27. In addition to scanning device 23, housing 22 includes another circuit board 24, which is arranged as a ring and on which chips of evaluation electronics 25 are mounted. An ASIC chip 25.1 is associated with evaluation electronics 25 among other things. Integrated into this ASIC chip 25.1 is a circuit 25.13 for determining the relative rotational speed n between scanning device 23 and measuring graduation 13 as well as a regulator unit 25.12. Regulator unit 25.12 has a unit 25.12a associated with it, the function of which is described in more detail below. Furthermore, ASIC chip 25.1 includes, among other things, a temperature sensor 25.11. Circuit board 24 has a plug connector 26, to which a connecting cable to subsequent electronics 2 (FIG. 3) is connectable.

According to the example embodiment illustrated, the angular position measuring device is provided in a hollow shaft construction such that shaft 1, the angle of rotation α of which is to be measured, is received by the angular position measuring device in an enclosing manner.

Measuring graduation 13 and scanning device 23 are arranged rotatably in relation to each other, measuring graduation 13 fastened to shaft 1 rotating when the angular position measuring device is in operation. Accordingly, the relative rotational speed n between scanning device 23 and measuring graduation 13 also corresponds to the rotational speed n between shaft 1 and stationary flange 21, that is, expressed in a simplified manner, to the rotational speed n of shaft 1. The non-rotating excitation coils on stator-side scanning device 23 produce a homogeneous alternating field, which is modulated by measuring graduation 13 as a function of the angular position or of angle of rotation α of shaft 1. In the sensor coils, which are located on scanning device 23, angle-dependent output signals A, B are produced by the modulated electromagnetic field. These output signals A, B are supplied to evaluation electronics 25, where these are processed further. In regulator unit 25.12, output signals A, B are regulated such that they always have constant signal amplitudes or levels. For this purpose, first signal amplitudes $L_{act}$ of output signals A, B are determined as actual values in unit 25.12a. Subsequently, deviation δ between the previously determined signal amplitudes $L_{act}$ and a specified setpoint amplitude value $L_{set}$ are determined. An actuating variable S is ascertained as a function of the magnitude of deviation δ with the aim of keeping the deviation δ within specified limits. Due to an influencing of this actuating variable S, which in the exemplary embodiment illustrated is the supply of power to the transmitting coils, the signal amplitudes are largely kept at a constant magnitude.

Figure 2:
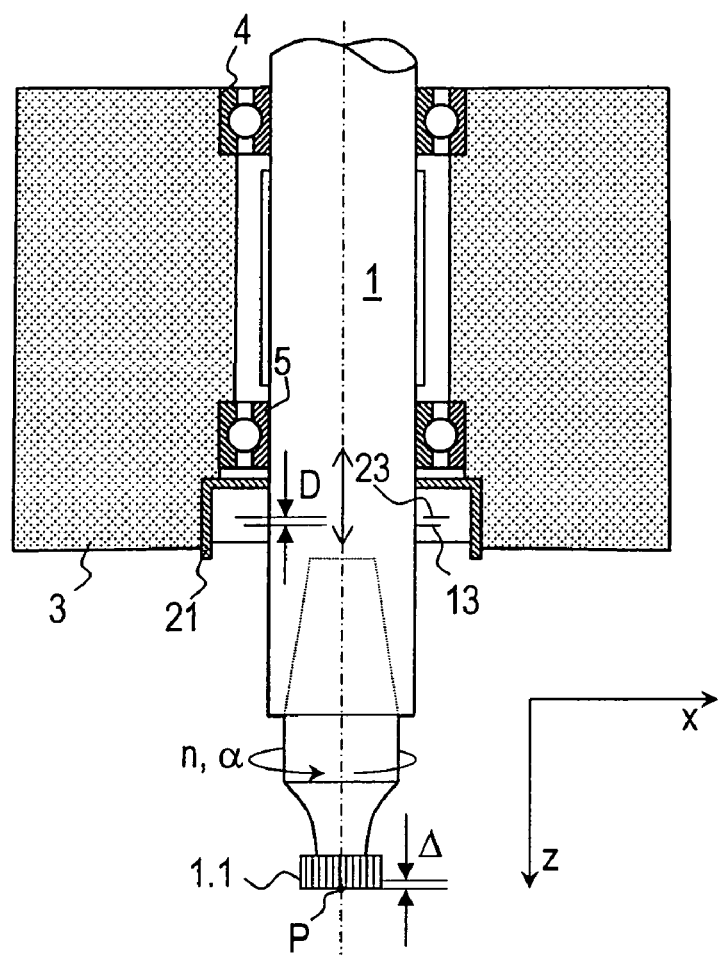
FIG. 2 schematically illustrates a machine tool spindle having an angular position measuring device.

As illustrated in FIG. 2, shaft 1 is used as a spindle of a machine tool. For this reason, a conical bore hole is provided in shaft 1 for receiving a tool 1.1, which is associated with shaft 1. Shaft 1 is rotatably supported by roller bearings 4, 5 and is able to be driven by an electric motor 3. In the arrangement illustrated, the angular position measuring device is located along shaft 1 between tool 1.1 and the bearing 5 that is closest to tool 2. In other words, the angular position measuring device is mounted on the machining side on shaft 1 or spindle.

If an arrangement such as that illustrated in FIG. 2 is operated over a longer period of time, then heat, for example from electric motor 3 and bearings 4, 5 is introduced into shaft 1. This results in a change in length D of shaft 1. Accordingly, the position of tool 1.1 shifts in the Z-direction by the change in length Δ. To increase the precision of the machine tool, the magnitude of the change in length Δ is determined and supplied to the numeric control of the machine tool or subsequent electronics 2 for positional correction, the change in length Δ being output, e.g., in 1 μm to 10 μm increments. Using the angular position measuring device, no separate position measuring device is required for determining the change in length Δ.

First the actual value of the scanning distance D is determined. For this purpose, the output signals A, B, incremental signals phase-shifted by 90°, are supplied to evaluation electronics 25 by scanning device 23. In regulator unit 25.12, a magnitude of actuating variable S required for regulating the constant signal amplitudes is formed. Signal amplitudes $L_{act}$ are determined in unit 25.12a in that an amplitude average value is formed in each case from eight consecutive output signals A, B. Afterwards, a check is performed to what extent the signal amplitudes $L_{act}$ determined in this manner deviate from a specified setpoint amplitude value $L_{set}$. If the magnitude of the deviation $|\delta|(\delta=L_{act}-L_{set})$ is too great or if the signal amplitudes $L_{act}$ are outside of the predetermined regulating window, then the magnitude of the actuating variable S or the amplification factor is changed accordingly such that the levels or signal amplitudes of output signals A, B approximate the setpoint amplitude value $L_{set}$.

Furthermore, the rotational speed n of shaft 1 is determined in circuit 25.13 on the basis of output signals A, B.

In addition, temperature T in the angular position measuring device—the temperature prevailing in housing 22 of the angular position measuring device—is determined or measured by temperature sensor 25.11, which is integrated into ASIC chip 25.1.

In general it can be observed that the magnitude of actuating variable S or the amplification factor for supplying power to the transmitting coils increases with a growing actual scanning distance D. This general consideration, however, does not provide the actual scanning distance D with the precision that would be required for the correction of the position of the machine tool. The precision may be improved to a sufficient extent if the temperature T is also taken into account in the angular position measuring device. When temperature T rises, the required magnitude of actuating variable S rises as well. Thus, the determination of scanning distance D is also based on the detected temperature T. In order to increase the precision further, the existing detected rotational speed n of shaft 1 is additionally used in a correcting manner for determining scanning distance D.

Scanning distance D, which is determined as a function of the magnitude of actuating variable S, of the measured temperature T and the existing rotational speed n, is supplied in digital form to another electronic circuit, which is integrated into ASIC chip 25.1. If a comparatively large regulating window may be specified for the regulation, that is, if no change of actuating variable S occurs even at a relatively large deviation |δ|, then the determination of scanning distance D may be optionally based on the actual value of signal amplitude $L_{act}$ instead of actuating variable S. Such a regulating unit may be arranged having a secondary control circuit, in the sense of a cascade control. Regardless of whether actuating variable S or directly the signal amplitudes $L_{act}$ is or are used for the subsequent method steps in the operation of the angular position measuring device, the determination of scanning distance D is always based on signal amplitudes $L_{act}$, for actuating variable S, after all, is itself based on signal amplitudes $L_{act}$.

A so-called motor model is stored in ASIC chip 25.1, which, based on scanning distance D as input value, allows for the determination or computation of the change in length Δ for a point P on shaft 1 outside of the angular position measuring device. For this purpose, it may be provided that sleeve 12 and shaft 1 have the same coefficient of thermal expansion. The shift of point P in the Z-direction by change in length Δ may then be taken into account when positioning tool 2. Geometric machine data and thermodynamic variables may be worked into the motor model. In a simple arrangement and in suitable geometric conditions, however, the change of scanning distance D in relation to a reference distance, e.g., at room temperature, may be used directly for correcting the position. That is, the change of scanning distance D under certain condition may be treated as equal to change in length Δ for a point P outside of the angular position measuring device.

Figure 3:
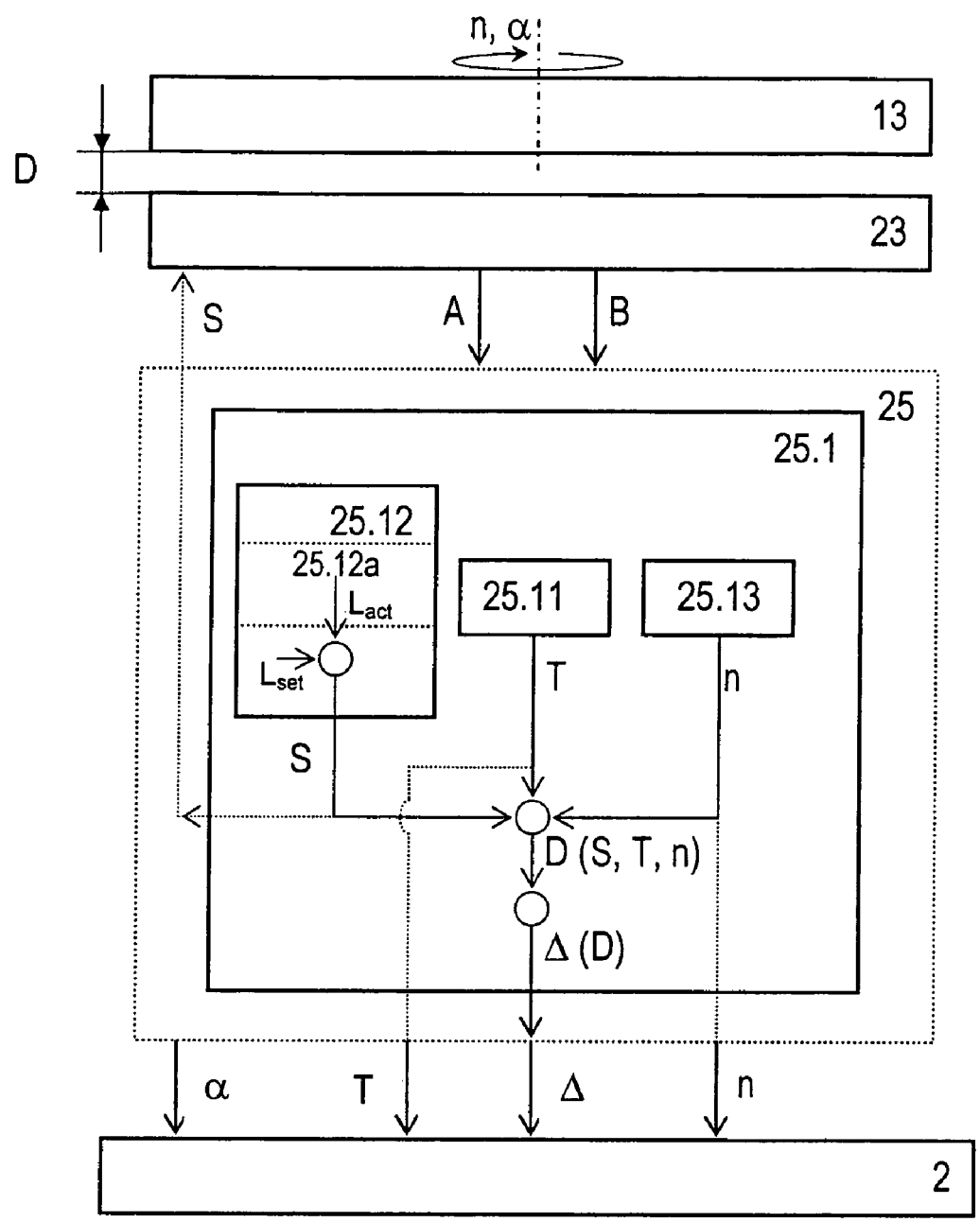
FIG. 3 schematically illustrates a method for the operation of an angular position measuring device.

Depending on the particular requirements, either scanning distance D or change in length Δ or both variables may be transmitted to subsequent electronics 2, e.g., by serial data transmission via an interface arrangement on the angular position measuring device. Furthermore, as illustrated in FIG. 3, angle of rotation α, rotational speed n of shaft 1 and temperature T in the angular position measuring device are also transmitted to subsequent electronics 2 for further electronic processing.

What is claimed is:

1. A field-modulating angular position measuring device, comprising:
    a scanning device adapted to produce angle-dependent output signals;
    a measuring graduation, the scanning device and the measuring graduation arranged rotatably with respect to each other at a scanning distance;
    evaluation electronics adapted to process the output signals;
    a unit adapted to determine signal amplitudes of the output signals; and
    a temperature sensor adapted to determine a temperature in the angular position measuring device, the scanning distance determinable in accordance with the temperature and the signal amplitudes.

2. The field-modulating angular position measuring device according to claim 1, wherein the unit is associated with a regulator unit adapted to regulate the signal amplitudes of the output signals in accordance with an actuating variable to not exceed a specified deviation from a setpoint amplitude value.

3. The field-modulating angular position measuring device according to claim 1, further comprising a circuit adapted to determine a relative rotational speed between the scanning device and measuring graduation to determine the scanning distance.

4. The field-modulating angular position measuring device according to claim 1, wherein the evaluation electronics are adapted to determine the scanning distance.

5. The field-modulating angular position measuring device according to claim 1, wherein the evaluation electronics are adapted to determine a digital value for the scanning distance.

6. The field-modulating angular position measuring device according to claim 1, further comprising an interface adapted to transmit a value for the scanning distance to subsequent electronics.

7. The field-modulating angular position measuring device according to claim 1, wherein the evaluation electronics include an ASIC chip.

8. The field-modulating angular position measuring device according to claim 1, wherein the temperature sensor is integrated into the evaluation electronics.

9. The field-modulating angular position measuring device according to claim 8, wherein the evaluation electronics include an ASIC chip, the temperature sensor integrated into the ASIC chip.

10. The field-modulating angular position measuring device according to claim 1, wherein the angular position measuring device is configured such that a shaft, an angle of rotation of which is to be measured, is receivable by the angular position measuring device in an enclosing manner.

11. The field-modulating angular position measuring device according to claim 1, wherein the angular position measuring device is arranged as an inductive angular position measuring device.

12. A method for operating a field-modulating angular position measuring device that includes a scanning device and a measuring graduation rotatable relative to each other, angle-dependent output signals produced in the scanning device, comprising:
    (a) determining signal amplitudes of the output signals;
    (b) measuring a temperature in the angular position measuring device; and
    (c) determining a scanning distance in accordance with the signal amplitudes and the temperature.

13. The method according to claim 12, further comprising:
    determining a deviation between the signal amplitudes of the output signals determined in the determining step (a) and a setpoint amplitude value; and
    ascertaining an actuating variable as a function of a magnitude of the deviation to maintain the deviation within specified limits, the scanning distance determined in the determining step (c) in accordance with the actuating variable.

14. The method according to claim 12, wherein the field-modulating angular position measuring device is arranged on a shaft, the method further comprising determining a change in length of the shaft for a point on the shaft outside of the angular position measuring device in accordance with the scanning distance.

15. The method according to claim 12, further comprising detecting a relative rotational speed between the scanning device and the measuring graduation, the scanning distance determined in the determining step (c) in accordance with the rotational speed.

16. The method according to claim 12, further comprising simultaneously processing the output signals and measuring the temperature in the measuring step (b) in evaluation electronics.

17. The method according to claim 12, wherein the angular position measuring device is arranged as an inductive angular position measuring device.

18. The method according to claim 12, wherein the scanning device and the measuring graduation are arranged rotatably with respect to each other at the scanning distance, the field-modulating angular position measuring device further including:
- evaluation electronics adapted to process the output signals;
- a unit adapted to determine the signal amplitudes of the output signals; and
- a temperature sensor adapted to determine the temperature in the angular position measuring device, the scanning distance determinable in accordance with the temperature and the signal amplitudes.

19. A field-modulating angular position measuring device, comprising:
- scanning means for producing angle-dependent output signals;
- measuring graduation means, the scanning means and the measuring graduation means rotatably with respect to each other at a scanning distance;
- evaluation means for processing the output signals;
- means for determining signal amplitudes of the output signals; and
- temperature sensing means for determining a temperature in the angular position measuring device, the scanning distance determinable in accordance with the temperature and the signal amplitudes.

20. The field-modulating angular position measuring device according to claim 1, wherein the scanning device is adapted to produce the angle-dependent output signals in accordance with at least one of (a) an inductive measurement principle and (b) a capacitive measurement principle.

21. The field-modulating angular position measuring device according to claim 1, wherein the evaluation electronics are adapted to determine the scanning distance based on the temperature determined by the temperature sensor and the signal amplitudes.

22. The field-modulating angular position measuring device according to claim 1, wherein the scanning distance is an axial scanning distance between the scanning device and the measuring graduation.

23. The method according to claim 12, further comprising producing the angle-dependent output signals in the scanning device in accordance with at least one of (a) an inductive measurement principle and (b) a capacitive measurement principle.

24. The method according to claim 12, wherein the scanning distance is an axial scanning distance between the scanning device and the measuring graduation.

25. The field-modulating angular position measuring device according to claim 19, wherein the scanning means produces the angle-dependent output signals in accordance with at least one of (a) an inductive measurement principle and (b) a capacitive measurement principle.

* * * * *